Jan. 5, 1954    R. O. AARVOLD    2,664,947
OPERATING DEVICE FOR HOLD HATCHES
Filed Nov. 19, 1951    2 Sheets-Sheet 1
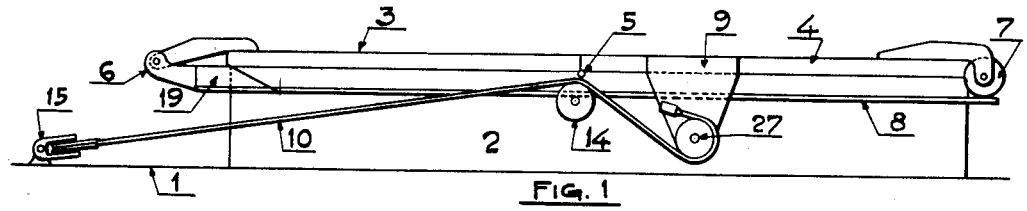
FIG. 1
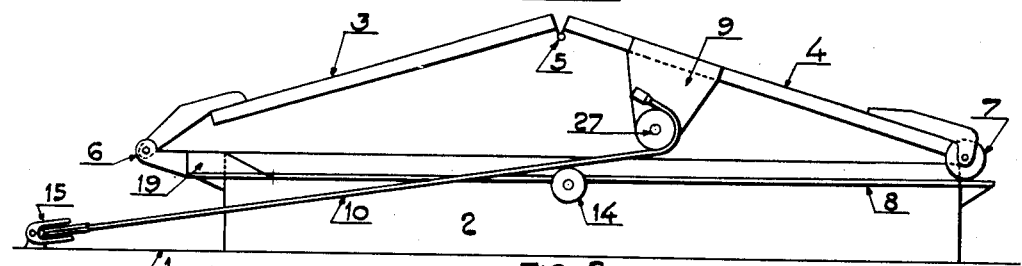
FIG. 2
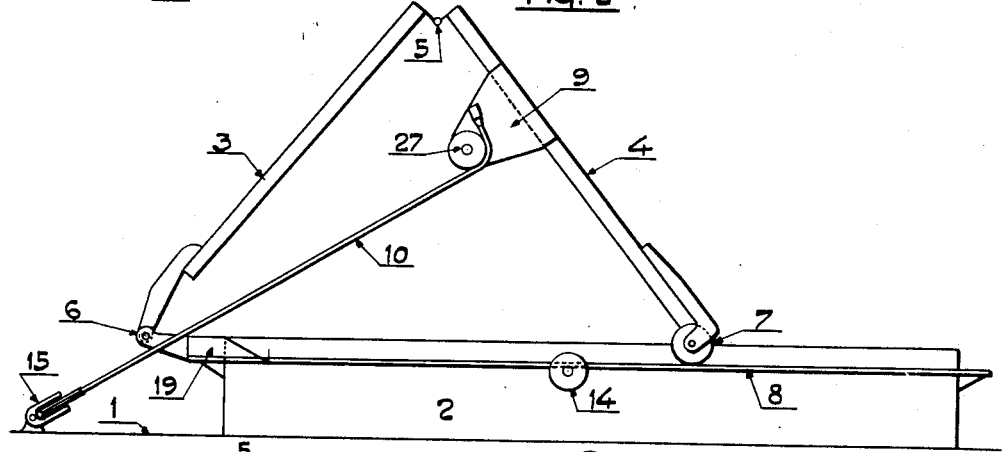
FIG. 3
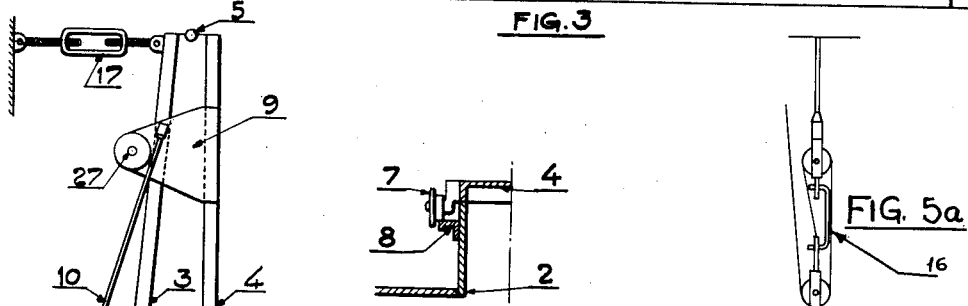
FIG. 4
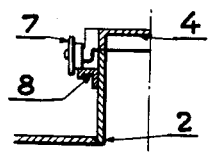
FIG. 5a
FIG. 6
Inventor
Reinhardt Olai Aarvold
By Cushman, Darby & Cushman
Attorneys

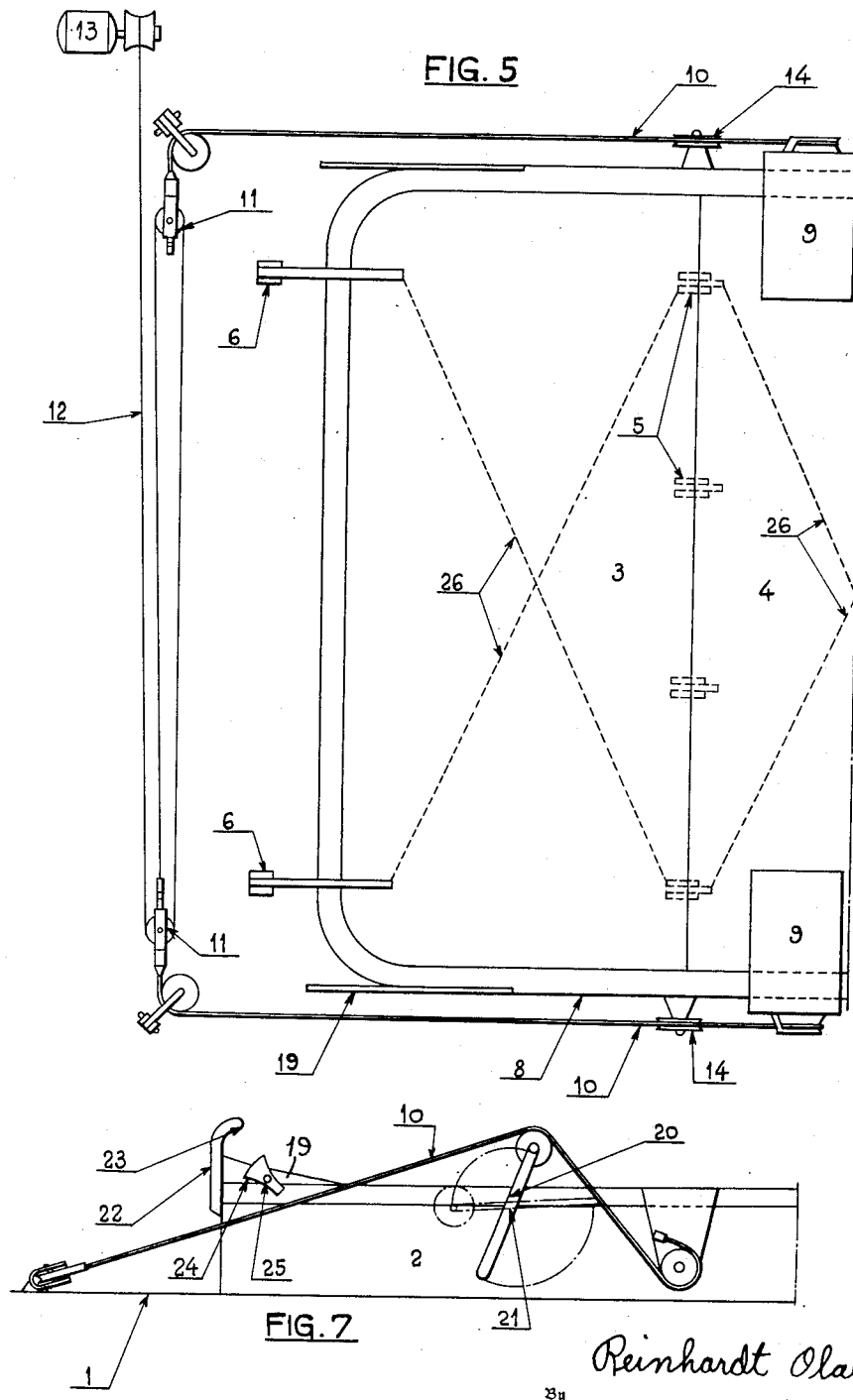

Patented Jan. 5, 1954

2,664,947

UNITED STATES PATENT OFFICE 2,664,947

OPERATING DEVICE FOR HOLD HATCHES

Reinhardt Olai Aarvold, Goteborg, Sweden, assignor to Aktiebolaget Gotaverken, Goteborg, Sweden, a corporation of Sweden Application November 19, 1951, Serial No. 257,119

Claims priority, application Sweden December 11, 1950

11 Claims. (Cl. 160—193)

The present invention relates to an operating device for a hold hatch of the kind consisting of two sections foldably connected to each other, one of said sections being swingably attached by means of hinges to the frame surrounding the hatch opening, and the other section resting, on the side thereof remote from the hinged side, on the frame by means of antifriction members. In arrangements of this kind as hitherto known, the hatches would be opened either by the ordinary derricks or from special bollards for the purpose in view. In both cases a certain rigging work is required every time the hatches are to be opened or closed. The use of special bollards also involves considerably increased expenses for the installation.

It is the object of the invention to simplify this rigging work and to reduce the cost of the operating means.

I attain this object by mechanism shown in the annexed drawing, in which:

Figs. 1 to 4 are side elevations of the hold hatch with the hatch sections in different opening positions; Fig. 5 is an illustration of the hatch viewed from above; Fig. 5a is a partial view of an operating device in a position corresponding to the entirely opened hatch; Fig. 6 is a cross section of a detail of the hatch frame; and Fig. 7 shows an alternative construction of the drawing members.

1 designates the deck of a ship having an opening provided therein, which is surrounded by a frame 2. The opening is covered by a hatch, which is made in two sections 3, 4. These sections are foldably connected with one another by a number of hinges 5, which are arranged on the lower side of the sections, in a manner such that the upper side thereof is level and without any upwardly projecting hinge parts or reinforcements, when the hatch is closed.

One of the hatch sections is united with the frame 2 by means of hinges 6 arranged in such manner that the distance from their center to the frame is at least as great as the space occupied by the hatch sections when folded together. When the hatch is in open position as shown in Fig. 4, the whole opening will consequently be uncovered.

The hatch section 4 is provided with antifriction members, such as two wheels 7 at the end thereof remote from the hinged side, said wheels running on a reinforcing iron 8 extending round the frame. Two brackets 9 project from this hatch section downwardly toward the deck. They make attachments for two ropes 10 extending along the hatchway coamings while being mutually united through a tackle containing two multi-fold purchases 11. The pulling part 12 of this tackle is connected to a suitable source of power, such as an ordinary cargo winch 13.

Each rope runs from the point of attachment in the hatch section 4 over a fair-leader or guide pulley 14, which is so arranged in the frame 2 that the upper edge thereof is located on a level higher than that of the point of attachment of the rope in the bracket 9 when the latch is closed. When the rope is subjected to a pulling effect, the hatch section 4 will be raised. It is necessary that the point of attack of the rope be so situated relatively to the center of gravity of said hatch section that the portion of the hatch located near the hinges 5 will be the one which is raised first. In this manner the hatch sections are caused to fold upon one another, the remote end of the section 4 on the wheels 7 moving toward the hinge 6.

Figs. 1 to 4 show four different positions during the opening movement of the hatch. In Fig. 1, the hatch is shown in its closed position. Each rope extends through a block 15 pivotally secured in the deck, and over the fair-leader 14 to the bracket 9. The lower portion of this bracket is made as a circularly shaped guide 27 for the rope which is coiled somewhat more than half a turn about said guide while being secured to the bracket on the upper side of the guide. The length of the bracket and the guide and the point of attachment are adapted so that the point of contact in the guide and the point of attachment will never come past a line from the block 15 to the axis of the hinges 5. The block 15 allows the angular movement of the rope during the opening of the hatch.

When the rope is subjected to a pulling effect, the hatch sections will be raised into the positions shown in Fig. 2. The rope is thus uncoiled from the guide 27, and in this position it extends rectilinearly from the block 15 while touching the upper side of the fair-leader and the lower side of the guide.

Here, the cooperation with the leader 14 ceases, and upon a continued pull the rope will act directly on the hatch section 4 over the bracket 9. An arbitrary intermediate position is shown in Fig. 3. The rope has been uncoiled somewhat more from the guide 27 and acts directly upon the bracket, the lower portion of the section 4 being then dragged on the wheels toward the hinges 6.

Finally, the hatch is shown entirely raised in

Fig. 4. The rope is now completely uncoiled from the guide 27 and runs directly to the point of attachment in the bracket 9. This point is located in a manner such that an imaginary extension of the rope will pass through the axis of the hinges 5 or in the range between said axis and the hatch section 4. Hereby, those moments are avoided which, if the extension had been on the opposite side of the axis of the hinges, would have caused an unstable final position, particularly for the section 4.

When the hatch opening is to be closed, the procedure is such that the pulling part of the tackle is slowly eased off, the hatch sections then reassuming their place by themselves. To make it possible for the hatch sections to commence the movement, the portion of the reinforcing irons 8 adjacent to the hinges 6 and carrying the wheels running thereon may be made into a rising curve 19. The hatch section 4 is so much smaller than the section 3 plus the distance from the edge of the hatch to the hinges 6 as corresponds to the rise of the curve path. As soon as the ropes slacken somewhat, the wheels will have a tendency toward sliding down the curved path, and once the movement has commenced, it will not cease, before the hatch is in its closed position, provided the ropes are given the requisite freedom.

Fig. 7 shows an alternative construction. To secure an improved lifting power when the opening movement is commenced, the fair-leader is arranged on an arm 20, which raises the same above the level of the frame. This arm may be lowered, when the operating device is not in use, as shown by chain-dotted lines at 21.

To retain the hatch in its open position, the following arrangements are provided. A stopper 22 is arranged at the end of the elevated curved path, which stopper is made at the top into a hook 23, Fig. 7. When the hatch section 4 is brought up to the top point of the path, the hook will grip about the axle of the wheel of the hatch section so as to prevent the hatch—should the tractive force not be interrupted in time—from being moved over the position of equilibrium and from falling "rearwardly" from the opening. Somewhat lower down on the curved path there is provided a locking device 24 equipped with a counter-weight, said locking device being pivotally mounted on a stud 25. When the wheel rolls up along the curved path, it will press down the locking device, but as soon as the wheel has passed the latter, the counter-weight raises it into locking position again. The wheel cannot then slide down the path, even if the pull in the ropes should cease entirely, before the locking member has been moved aside by suitable means.

When the hatch is opened, the pulling effect is exerted, as stated, through two ropes secured in the outer one of the two sections. Should the pulling force become irregular for some reason or other, this would involve a non-desirable false position of the hatch sections. To avoid this, the ordinary bracing by parallel beams is replaced by two diagonally extending beams 26, which are shown diagrammatically in Fig. 5 by dash lines, said beams extending approximately from the hinges 6 to the propinquity of the outermost hinges 5 on the opposite side. These beams equalize differences in the pulling force and transmit such differences to the opposite side of the hatch, without the latter taking a false position.

The embodiments described above with reference to the drawing are only to be regarded as examples of the invention, the details of which may be varied in a number of ways within the scope of the following claims. In connection with very large hatches, it will thus be possible to cause the device now disclosed to cover only one half of the opening, a corresponding device being then provided for the other half. In such case the hatch opening is covered by four sections. The hatch sections may be provided with packing and securing means to bring about the requisite tightening of the joints.

In addition to the arrangement shown in Fig. 7, locking means of various kinds may be used for the retainment of the hatches in their open position. As shown in Fig. 5a, the tackle between the ends of the ropes may thus be replaced or supplemented by a link 16 or similar member adapted rigidly to connect the purchases 11 at the ends of the ropes. A turn-buckle 17 or similar member may be provided between the hatch section 3 and a fixed object, such as a mast, a bollard or deck housing, Fig. 4. In cases where the hatch sections at two adjacent hatch openings are arranged at the adjacent sides of the latter, locking means may be arranged between the upright hatch sections.

What I claim is:

1. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, one end of each rope being attached to said second section, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act upon said second hatch section.

2. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, brackets depending from said second section, said ropes being at one end attached to said brackets, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act on said brackets.

3. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, one end of each rope being attached to said second section, means including a tackle comprising two purchases provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act upon said second hatch section.

4. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, brackets depending from said second section and having circular guide faces for said ropes, said ropes being in the closed position of the hatch at one end wound approximately half a turn about said guide faces and attached to said brackets, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act on said brackets.

5. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, brackets depending from said second section and having circular guide faces for said ropes, said ropes being in the closed position of the hatch at one end wound approximately half a turn about said guide faces and attached to said brackets, the points of attachment of the ropes on said brackets being located so as, in the entirely open position of the hatch, each rope is directed against the axis of said second hinge joint, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act on said brackets.

6. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, brackets depending from said second section and having circular guide faces for said ropes, said ropes being in the closed position of the hatch at one end wound approximately half a turn about said guide faces and attached to said brackets, the points of attachment of the ropes on said brackets being located so as to have, in the entirely open position of the hatch, each rope is directed against the axis of said second hinge joint and said second hatch section, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act on said brackets.

7. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, one end of each rope being attached to said second section, substantially diagonally extending braces for said hatch sections, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act upon said second hatch section.

8. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, one end of each rope being attached to said second section, the distance from said first hinge joint to said frame being at least equal to the distance between said hatch sections in the entirely open position of the hatch, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act upon said second hatch section.

9. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, one end of each rope being attached to said second section, rails for said antifriction members, said rails having slightly ascending portions adjacent to said first hinge joint, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act on said second hatch section.

10. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, one end of each rope being attached to said second section, rails for said antifriction members, said rails having slightly ascending portions adjacent to said first hinge joint, a stop member provided at the end of at least one of said ascending rail portions and adapted to engage said antifriction member in the fully opened position of the hatch, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act on said second hatch section.

11. An operating device for a hold hatch of the type resting on a frame of the hold opening and comprising a first hatch section, a first hinge joint connecting said first section with said frame, a second hatch section having antifriction members resting on said frame, and a second hinge joint interconnecting said two sections, comprising two ropes extending on opposite sides of the hold opening transversely of the axes of said hinge joints, one end of each rope being attached to said second section, rails for said antifriction members, said rails having slightly ascending portions adjacent to said first hinge joint, a locking device on at least one of said ascending rail portions, said locking device being constructed and arranged to permit said antifriction member to pass upwardly along the rail and to prevent unintentional downward movement, means provided near said first hinge joint and operable to exert tractive forces upon said ropes, and fair-leaders for said ropes, said fair-leaders being mounted in said frame and having, in the closed position of the hatch, their upper rope contacting faces located at a level higher than the points at which the ropes act on said second hatch section.

REINHARDT OLAI AARVOLD.

References Cited in the file of this patent

UNITED STATES PATENTS

| Number | Name | Date |
|---|---|---|
| 834,287 | Frey | Oct. 30, 1906 |
| 935,431 | Tackman | Sept. 28, 1909 |
| 2,022,142 | Morris | Nov. 26, 1935 |
| 2,097,950 | Johnson | Nov. 2, 1937 |
| 2,274,216 | Sanders | Feb. 24, 1942 |

FOREIGN PATENTS

| Number | Country | Date |
|---|---|---|
| 774,719 | France | Sept. 24, 1934 |